US 8,359,465 B2

(12) United States Patent
Feezel et al.

(10) Patent No.: US 8,359,465 B2
(45) Date of Patent: *Jan. 22, 2013

(54) ENTERPRISE SECURITY SYSTEM

(75) Inventors: Richard M. Feezel, Tallahassee, FL (US); Gerard A. Gagliano, Corrales, NM (US)

(73) Assignee: Gerard A. Gagliano, Corrales, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/872,479

(22) Filed: Aug. 31, 2010

(65) Prior Publication Data

US 2011/0040965 A1    Feb. 17, 2011

Related U.S. Application Data

(63) Continuation of application No. 10/439,114, filed on May 15, 2003, now Pat. No. 7,788,700.

(60) Provisional application No. 60/378,130, filed on May 15, 2002.

(51) Int. Cl.
| | |
|---|---|
| H04L 29/06 | (2006.01) |
| H04L 9/32 | (2006.01) |
| G06F 7/04 | (2006.01) |
| G06F 17/30 | (2006.01) |
| H04K 1/00 | (2006.01) |
| G06F 15/00 | (2006.01) |
| G06F 21/00 | (2006.01) |

(52) U.S. Cl. ........ 713/156; 713/163; 713/168; 713/175; 726/2; 726/27

(58) Field of Classification Search ................ 726/2, 27; 713/163, 168, 175, 156
See application file for complete search history.

(56) References Cited

U.S. PATENT DOCUMENTS

| 6,820,063 B1 | 11/2004 | England et al. |
| 7,013,389 B1 | 3/2006 | Srivastava et al. |

(Continued)

FOREIGN PATENT DOCUMENTS

WO    WO2009/046758    4/2009

(Continued)

OTHER PUBLICATIONS

Ian Goldberg, Berkant Ustaoğu, Matthew D. Van Gundy, Hao Chen; "Multi-party off-the-record messaging"; Nov. 2009; CCS '09: Proceedings of the 16th ACM conference on Computer and communications security; pp. 358-368.*

(Continued)

*Primary Examiner* — Eleni Shiferaw
*Assistant Examiner* — Courtney Fields
(74) *Attorney, Agent, or Firm* — Jeffrey D. Myers; Isaac Estrada; Peacock Myers, P.C.

(57) ABSTRACT

A platform of Trust Management software which is a single, customizable, complete distributed computing security solution designed to be integrated into an enterprise computing environment. Digital Network Authentication (DNA) is the centerpiece of the system of the present invention. It is a unique means to authenticate the identity of a communicating party and authorize its activity. The whole mechanism can be thought of as a trusted third party providing assurances to both clients and servers that each communicating entity is a discrete, authenticated entity with clearly defined privileges and supporting data. Furthermore, the level of trust to be placed in the authorization of every entity communicating within the system is communicated to every entity within a distributed computing environment.

20 Claims, 4 Drawing Sheets

U.S. PATENT DOCUMENTS

| | | |
|---|---|---|
| 7,788,700 B1 | 8/2010 | Feezel et al. |
| 2003/0074248 A1 | 4/2003 | Braud et al. |
| 2004/0083394 A1* | 4/2004 | Brebner et al. ............... 713/202 |

FOREIGN PATENT DOCUMENTS

| | | | |
|---|---|---|---|
| WO | WO 2009046758 A1 * | 4/2009 | |

OTHER PUBLICATIONS

, "Google Results: Communication, trusted third party, authentication, computer . . . ", http://www.google.com/search?hl=en&lr=as_qdr=all&sa=X&oi=spell&resnum=0& ct=resu . . . Sep. 18, 2008 , 1-2.

"Google Results: Authentication, mechanism, trust, confidence, server, BIOS . . . ", http://www.google.com/search?hl=en&as-q=authentication+mechanism%2C+trust%2C+co . . . May 28, 2010 , 1-2.

"Google Results: Authentication, third party server, authorization, trust . . .", http://www.google.com/search?hl=en&as_q=authentication%2C+third+party+server%2C+au . . . May 19, 2008 , 1-2.

"Google Results: trust level, server, digital signature, event recorder"authentication . . . , http://www.google.com/search?hl=en&as_q=trust+level%2C+server%2C+digital+signature . . . Apr. 23, 2009 , 1-2.

, "IEEE Xplore—Search Results", http://ieeexplore.ieee.org/search/searchresult.jsp?action=search&sortType=rowsPerPage=2 Mar. 12, 2010 , 1-5.

, "IEEE Xplore—Search Results", http://ieeexplore.ieee.org/search/searchresult.jsp?action=search&sortType=&rowsPerPage=2 May 28, 2010 , 1-5.

, "PORTAL Results: Authentication and mechanism, and encrypt, and secret and key . . . ", http://portal.acm.org/results.cfm?CFID=89940698&CFTOKEN=82891737&adv=1& COLL=. . . May 28, 2010 , 1-6.

, "PORTAL Results: Trusted and system, and authentication, and entity and server", http://portal.com.org/results.cfm?CFID=61268488&CFTOKEN=5356180&adv=1&COLL=. . . Nov. 4, 2009 , 1-6.

Popescu, Bogdan C. et al., "A DRM Security Architecture for Home Networks", *DRM'04: Proceedings of the 4th ACM Workshop on Digital Rights Management*. ACM Oct. 25, 2004 , 1-10.

* cited by examiner

ENTERPRISE SECURITY SYSTEM

This application is a continuation application of U.S. patent application Ser. No. 10/439,114, entitled "Enterprise Security System", filed on May 15, 2003, and the specification and claims thereof are incorporated herein by reference. This application also claims the benefit of U.S. Provisional Application Ser. No. 60/378,130, filed on May 15, 2002.

FIELD OF THE INVENTION

The present invention relates to an integrated computer software security platform for a distributed computing environment. More particularly, the present invention relates to a system to provide, within such a distributed computing environment, assurances that each communicating entity is a discrete, authenticated entity. For each authenticated entity, a trust level is assigned based on the method of authentication.

BACKGROUND OF THE INVENTION

Historically computer security was a matter of managing physical access to equipment. However, with the development of computer networks, new vulnerabilities have been introduced. Today's modern distributed computing environment (referred to herein as an "enterprise") is designed in such a way that at least a portion of the environment is vulnerable to many methods of tampering or eavesdropping or other security risks to the information contained within that environment. These risks are both internal to the enterprise and external. Existing solutions for addressing these vulnerabilities is to first try to identify where the vulnerabilities exist and then to add some sort of protection mechanism to each identified vulnerability. This typically results in a patchwork of independent protection mechanisms which are not only time consuming and expensive to construct, but also do not protect against vulnerabilities which may exist but have not been recognized. For a large enterprise, the security solutions are, typically, not enterprise wide.

Due to the very open nature of the common communications protocols used to knit a collection of devices (e.g., terminals, servers, applications, databases, etc.) together, the problem of ensuring all aspects of security is complex. In addition, as the use of computer systems becomes more pervasive, the challenge and importance of clearly authenticating the identity of every entity interacting with the enterprise increases as the concern over the risks associated with inappropriate access to information grows.

These risks are beginning to be recognized by current and planned legislation such as the "Health Insurance Portability and Accountability Act of 1996 (HIPAA)." Additionally, in the financial services area there are several interagency "Guidance" documents on "Authentication" and "Safeguarding Customer Information." See: http://www.bmck.com/ecommerce/fedlegis-s-fi.htm for a list of such documents. Information quality can only be attained by capturing information from trusted, high quality sources.

Meaningful access controls can only be implemented when the identity of those entities requesting access can be reliably authenticated. Patchwork solutions to computer and network security problems are expensive and notoriously unreliable. Expensive, specialized skill human resources are required to install and maintain each element of the patchwork. One attempt at addressing these problems is the Kerberos system which is a network authentication protocol developed at MIT and documented in publications of the Internet Engineering Task Force (IETF). It is designed to provide strong authentication for client/server applications by using secret-key cryptography. The Kerberos protocol attempts to address the entity authentication problem but does not incorporate the "trust level" concept of the present invention. Further, it has no mechanism for access or authorization controls, or auditing.

Further, none of the prior art incorporates the elements of computer security within an enterprise where a user can use a single sign-on for authentication and authorization which can be carried from, for instance, server to server to application, ensuring that the user, server or application is authorized and trusted to perform whatever action is requested.

Moreover, no current approach addresses the concept of different levels of trust for each entity, depending on the access requested to a particular server, application or database, etc., and also on the type of authentication used to request that access. Treating all authentications as equal results in a single trust level that is universally granted to all properly authenticated entities regardless of what type of authentication information is presented or the method in which it is communicated. This universal trust level does not address the environments of real world distributed computing environments where some activities are low risk and thus a low quality authentication of the relevant entities is sufficient, while other activities entail very high risks and should be allowed only when strong, highly reliable, and attack resistant authentication of relevant entities are used. For instance, low risk activities might involve an entity accessing some sensitive information which is available to any entity willing to identify itself and give a reason for needing access. Higher risk activities might involve an entity accessing systems which handle financial transactions on behalf of that entity. Even higher risk activities might include initiating financial transactions on behalf of entities where the interests of multiple entities (e.g., institutions) are involved. Still higher level risks would be associated with administrative access to the systems providing services mentioned above. In some highly sensitive cases it would be appropriate to require collaboration among several entities (e.g., officials in an institution) in order to complete an activity.

Finally, the current security systems within distributed computing environments only have the capability to communicate to the server the identity of an entity requesting access to the enterprise. Once this authentication has taken place, that entity is then free to access any other target entity (e.g., another server, application or database) communicating within the environment without notifying those other target entities of the identity of the entity pursuing such communication, much less requiring further authentication from these other entities.

Therefore, what is needed is a communications protection system which extends to all elements within a distributed computing environment which provides assurances that each entity within the environment attempting to communicate with or access other entities within that environment is a discrete, authenticated entity with an associated trust level.

OBJECTS OF THE INVENTION

It is an object of the invention to provide a system to authenticate the identity of every entity attempting to communicate with and within a distributed computer environment.

It is another object of the invention to assign one or more trust levels to all entities attempting to communicate with various targets (e.g., services, applications, data bases, etc.) in a distributed computing environment and securely communicate the associated trust level with all communications between the entity and those targets.

It is another object of the invention to provide secure channels for facilitating and protecting communications between entities in a distributed computing network.

It is another object of the invention to provide a secure storage facility for data objects and for entities to have tightly controlled access to those data objects applicable to the service it provides to a particular entity.

It is another object of the invention to provide a secure storage facility which is specifically designed to be usable as a store of access control data and also designed to ensure utility and applicability for numerous other purposes, including applications not currently required by the distributed computing environment.

It is another object of the invention to securely audit and record all instances of authentication activity within the distributed computing environment, and any anomalies which may indicate possible security penetration attacks.

It is another object of the invention to provide an extensible mechanism for analyzing activity for security, performance and other analysis to allow adaptation of the invention to future needs without modification of the original invention.

It is another object of the invention to provide a system to authenticate the identity of every entity attempting to communicate within a distributed computer environment that is transparent to the entity and target entities of that system.

It is another object of the invention to provide the foregoing objects with the minimum amount of education and system development expenses.

SUMMARY OF THE INVENTION

The present invention is a security platform to allow distributed computing environments to be enhanced (or designed and built) to provide: authentication of all users accessing the environment; secure inter-system communications; a flexible high quality authorization and supporting services store; an extensive auditing mechanism; and immediate recognition and reporting of attempts at inappropriate use. The integration of all these facilities in a seamless manner, with every component taking advantage of strong cryptographic techniques, results in a unified environment of trust and control. Common functions needed by nearly every distributed computing environment providing services either to other service processes or end users, which have in the past been only available through independent patchwork solutions, are consolidated into a security platform which will universally control access and assign one or more trust levels to every entity attempting access either to the enterprise itself or a particular network, server, application etc. within the enterprise. This authentication and assignment of trust levels to every such entity is referred to herein as the Digital Network Authentication (hereafter referred to as "DNA"). DNA dramatically lowers the cost associated with developing secure distributed systems by making a few straightforward additions to the fundamental concept of a communications socket which enables systems, servers, applications etc., to communicate with one another. The invention adds message transport protection, communicating entity identification, and a measure of the amount of trust to be placed in that identification. Target entities gain access to the additional capabilities of the DNA secure storage, which includes the capability of grouping certain entities with one another or applying an authentication or authorization policy to one or a group of entities. Developers need only use an ESS socket object in place of their conventional socket object when writing their software in order to gain all the advantages of the present invention. Essentially, the system of the present invention inserts itself between current "socket" implementations and the application programs that use them to provide enhanced security and some additional functionality with very little impact on the application software developer and can thusly be used as the transport for higher level concepts such as access to software objects and calling procedures which already exist within an enterprise.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the figures.

DESCRIPTION OF THE PREFERRED EMBODIMENT

Figure 1:
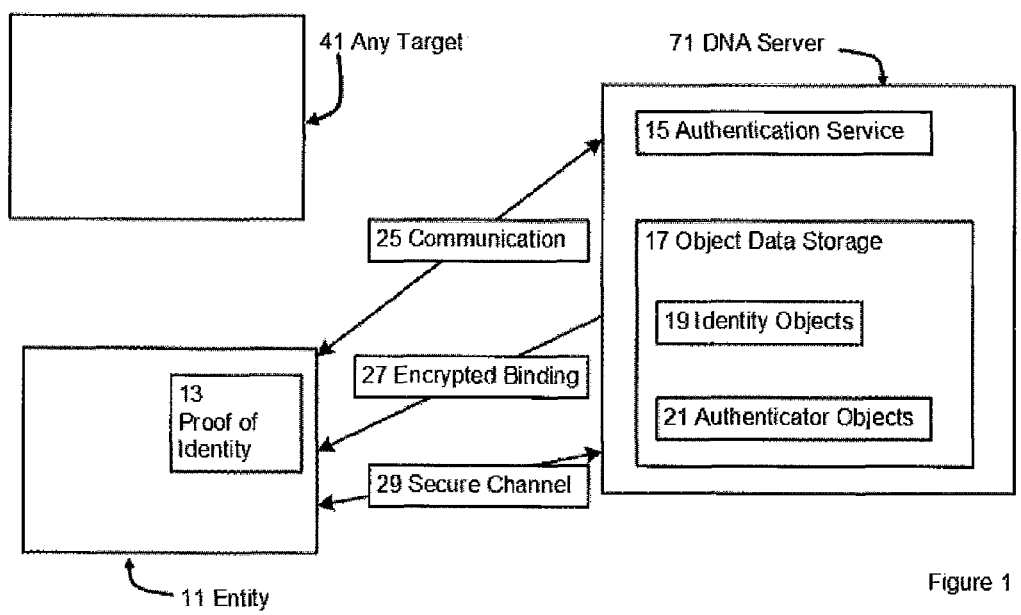
FIG. 1 is a block diagram depicting the authentication of an entity.

FIG. 1 illustrates the three basic components of the enterprise security system: entity 11, DNA server 71 and target 41. Entity 11 represents any user accessing a computer terminal, or a hardware application, or a software application or a server which needs to access target 41, which is also any user accessing a computer terminal, hardware application, software application or server. The software application can be, for instance, data bases such as accounts payable, accounts receivable, general ledger, payroll, inventory control, maintenance management, sales history, etc. Access is initiated by entity 11 establishing a communication 25 with DNA server 71 in an attempt to be authenticated. Within communication 25, entity 11 will communicate its proof of identity 13. This proof of identity 13 will then prompt the authentication service 15 within DNA server 71, to authenticate this proof of identity. This is accomplished by DNA server 71 retrieving from object store 17 the identity objects 19 and authenticator objects 21 associated with entity 11 according to the proof of identity 13 as communicated by entity 11. The proof of identity can range from a user name and password (low proof), to a user name, password and thumbprint (higher proof) to, for instance, a key (still higher proof).

The process of authentication can be accomplished through a variety of methods. Authenticator objects 21 can be, for example, a unique user name along with an associated password (secret) or some transformed version of the password. Because entity 11 would communicate this password or secret in the form of proof of identity 13 when requesting authentication, authenticator service 15 will authenticate entity 11 if the correct password as stored in authenticator object 21 is given. In one embodiment, authentication service 15 issues a challenge to entity 11, delivered in the form of a random number that is encrypted using a key derived from the password (secret) shared between entity 11 and authenticator object 21. Based on the information contained within proof of identity 13, entity 11 responds to this challenge by transforming the random number in the challenge message by computing a hash value using, for example, the SHA-1 or MD5 algorithm, and returning this hash value to authentication service 15, which will then verify that the computed hash value returned by entity 11 was computed correctly. In this way, proof of knowledge of the user name and password is verified without having to transmit that data over communication 25 between entity 11 and DNA server 71. This embodiment would also incorporate such features as timestamp and nonce values to prevent replay and pre-computed dictionary attacks which would allow someone to mount a high-speed offline attack against the authenticator service 15 and guess the password being used by entity 11. Based on the type of authentication engaged in by entity 11, DNA server 71 will assign a level of trust to entity 11. This level of trust is the amount of confidence that authentication service 15 has that entity 11 is indeed entity 11. The greater the proof of identity 13, the higher the trust level assigned by DNA server 71.

Once entity 11 is authenticated by authentication service 15 of DNA server 71, it receives a binding 27 with DNA server 71. This binding 27 is a packet of encrypted information which provides the necessary cryptographic keys and tokens necessary to establish a secure channel 29 between entity 11 and DNA server 71. For example, binding 27 will contain a randomly generated secret to be used by entity 11 when encrypting and signing future messages to the DNA server 71, the trust level value assigned by DNA server 71, and the expiration time of the binding 27 between entity 11 and DNA server 71.

As alluded to above, there are various methods for an entity 11 to authenticate itself with DNA server 71, and thus varying levels of trust that will be assigned to that entity 11. Another type of authentication, such as that based on an X.509 public key certificate, might contain only the distinguishing name (DN) expected in the certificate supplied by entity 11 in its proof of identity 13 when requesting authentication to DNA server 71. The certificate itself would supply the public key need for encrypting a binding 27 between entity 11 and DNA server 71 that is returned by authentication services 15. Validating the proof of identity 13, which in this case is in the form of the submitted certificate, would involve checking expiration dates and following the chain of certification signatures until a trusted root certificate was reached. The set of trusted root certificates can be stored as another identity object 19 in object store 17. Again, time stamp and nonce values can be used to secure these communications.

Depending on the type of authentication, the authentication service 15, using authenticator object 21, possibly in conjunction with some policy object 31 (discussed below), would establish the numerical trust level which is, again, a system-wide measure of confidence that entity is, indeed, the rightful owner of the proof of identity 13. This trust level would be securely recorded in binding 27 returned to entity 11 by DNA server 71. The trust level is indicative of the method of authentication utilized by entity 11 in its initial communication with DNA server 71.

Additional enhancements involve the storage of secrets and the performing of cryptographic transforms in special hardware token devices such as smart cards. These devices can provide a much higher degree of control over the secret information they contain than the typical general-purpose computer that contains essentially no high security storage mechanism. Further enhancements involve the use of a biometric measurement of a human characteristic such as a fingerprint. This biometric reading can be encrypted and sent to the authentication service 15 along with the authentication request and proof of identity 13 within communication 25 as additional supporting proof that entity 11 is truly the entity identified in proof of identity 13. As indicated above, this biometric measurement type of authentication would result in a higher level of trust placed in entity 11 by DNA server 71 through authenticating service 15.

Figure 2:
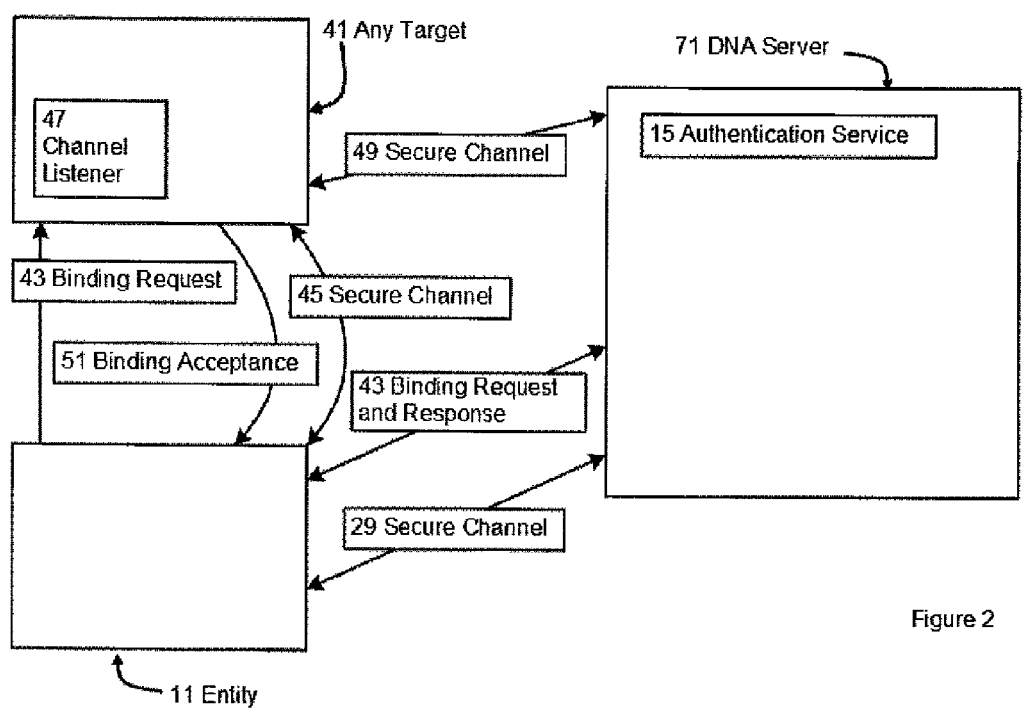
FIG. 2 is a block diagram depicting the communications to the targets between one entity and such target within a distributed computer system.

Once authenticated, as shown in FIG. 2, entity 11 can request a second binding 43 from DNA server 71 to access target 41. In response, DNA server 71 will return binding 43, which will contain the necessary cryptographic keys and tokens necessary for establishing a secure channel 45 between the entity 11 and the target 41. For example, binding 43 may be a packet of information which contains a secret (typically encrypted) that target 41 will use to sign and encrypt messages it sends to entity 11, a bundle of data to be presented to target 41 as proof of the identity of entity 11, and the expiration time of the binding 43. Target 41 incorporates a conventional channel listener 47 to field these incoming communications requests. If target 41 accepts binding 43, it will send an acceptance 51 to entity 11, and establish secure channel 45. Not only is a secure channel 45 established between the entity 11 and target 41 by using binding 43, but the identity 13 of entity 11, with the associated trust level given to entity 11 by DNA server 71 is securely delivered to target 41. Thus, DNA server 71, entity 11, and target 41 all have information regarding the level of trust to be placed in entity 11, and, unless a different type of authentication is used by entity 11, this level of trust is not changeable. Additionally, binding 43 will enable entity 11 to verify that target 41 is indeed the entity with which it desires communication.

Once target 41 has established a secure channel 45 with entity 11, target 41 will normally use a third secure channel 49 to the DNA server 71 (established after the target 41 successfully authenticated itself to the DNA server in a process analogous to that used by entity 11 to request the various DNA objects relevant to target 41 and associated with entity 11 which are stored in object store 15.

Figure 3:
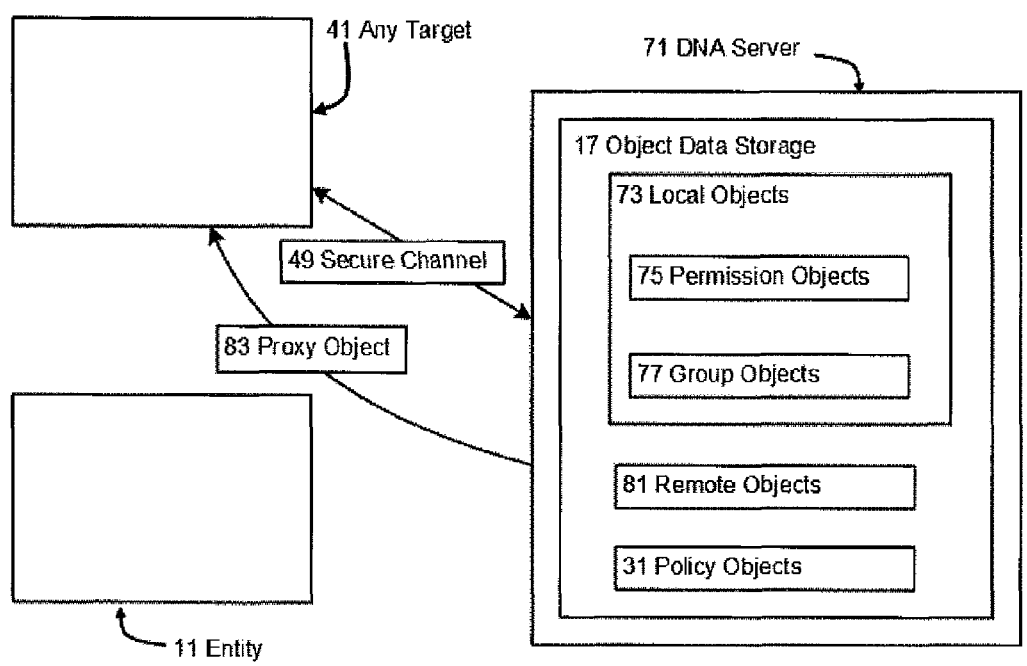
FIG. 3 is a block diagram depicting the communication of the characteristics of an entity attempting to access a target within a distributed computer system.

FIG. 3 shows the request for, and exchange of, various pieces of information, referred to as DNA objects, which are stored in the object store 17 of DNA server 71. This request from target 41 will communicate to DNA server 71 the identity of entity 11 and the level of trust initially assigned by DNA server 71 to be placed in entity 11. DNA server 71 will then retrieve from object store 17 only those objects associated with entity 11. These objects fall into two broad categories, local objects 73 and remote objects 81, with a third a third type of object referred to as policy objects 31.

First there are local objects 73, copies of which are sent to target 41. Local objects 73 are copied at the time target 41 requests the DNA objects for entity 11 from DNA server 71 and may consist of, for example, simple name/value permission objects 75, which are tested by target 41 before allowing entity 11 to access some resource managed by target 41. As an example, if target 41 is a service that provides access to a data table of records, permission objects 75 might be: QUERY, ADD, MODIFY, and/or DELETE. If entity 11 has the permission to perform any or all of these functions, the corresponding permission objects 75 must first be present within the local objects 73 of object store 17 and then must be copied to target 41. If the appropriate permission objects 75 are not present in object store 17, these permission objects 75 obviously cannot be copied to target 41 and thus entity 11 will not be allowed to perform those functions within target 41.

It is within this mechanism that the level of trust placed in entity 11 by DNA server 71 becomes critically important. Permission objects 75 (as well as any DNA object) may be conditioned upon entity 11 achieving a certain level of trust. As stated previously, target 41 communicates both the identity of entity 11 and level of trust associated with that entity 11 to DNA server 71 when requesting the DNA objects. One of the inherent features of permission objects 75, is the level of trust required in order for these permission objects 75 to copied to target 41. Therefore, it is possible for an entity 11 to have an associated permission object 75 in object store 17 for accessing target 41, but nonetheless be denied the access these permission objects 75 provide due to an insufficient level of trust attained by the method of authentication used by entity 11. The result in such a situation is that DNA server 17 will refuse to copy a permission object(s) 75 to target 41, and without such permission object(s) 75, target 41 will not allow access to entity 11. However, if entity 11 used a more secure or trustworthy method of authentication, this level would be communicated from target 41 to DNA server 71. If the requisite trust level of permission object 75 is now satisfied, permission object 75 would be copied to target 41, thus allowing entity 11 to access target 41.

These permission objects 75 serve various functions. For instance, another valuable use of name/value permission objects 75 is the storage of auxiliary authentication credentials. Additionally, if target 41 is a service that provides a gateway to a legacy system or application which cannot be updated to directly participate in the system of the present invention, target 41 can present authentication credentials to that legacy system on behalf of entity 11. In that case, target 41 could query entity 11 for the necessary credentials (or they could be supplied by a security administrator) which are stored as a permission object 75 in object store 17. Once copied to target 41, target 41 could transparently present the appropriate credentials to the legacy system. Another valuable use of name/value permission objects 75 would be personal customization information. Target 41 could offer entity 11 the capability to customize how target 41 responds to the requests of entity 11 or even heuristically analyze the behaviors of entity 11 to tailor itself to better meet the typical usage of entity 11. The DNA server 71 provides a safe, secure, easy-to-access and reliable storage facility for this client-specific information in object store 17.

Another type of local object 73 is group objects 77. If the data records of an enterprise are organized into groups, the identification information, characteristics and requisite trust levels associated with each group and the corresponding authorizations associated with the members of the group, are stored in object store 17 as group objects 77. This is useful in designating administrators of information that falls within certain groups. It is very common practice for more than one entity 11 to be grouped together, or assigned roles as in RBAC terminology, because they possess one or more characteristics in common. DNA server 71 is programmed to understand this and transparently hides the details of this from target 41 when retrieving DNA objects for the object store 17. For instance, when target 41 requests the DNA objects of entity 11, DNA server 71 implicitly and transparently constructs the collection of DNA objects from object store 17 that are uniquely associated with entity 11 including group objects 77 (if any). Thus, entity 11 transparently inherits all the group objects 77 of the groups to which it belongs. In addition, if target 41 is associated with a group, it can request from DNA server 71 those characteristics of entity 11 (or any group objects 77 associated with entity 11) that may have an impact of the group objects 77 of target 41.

The second type of objects located in object store 17 are remote objects 81, which exist only in the DNA server 71, that is no copy of these objects are sent to target 41. Remote objects 81 are invoked by target 41 through a remote method invocation (RMI) type mechanism which is transported over secure channel 49. Instead of being copied to target 41, target 41 receives a handle or proxy object 83, which intercepts the RMI requests and forwards them for processing through secure channel 49 to the instance of the proxy object 83 in DNA server 71. In the realm of access authorization, these remote objects 81 can implement a number of sophisticated policies. Since the remote object 81 is only contained in DNA server 71, it can be programmed to maintain knowledge of multiple concurrent activities and needs of entity 11. Other uses of remote objects 81 include mini-services that, because of their location in DNA server 71, could provide high performance maintenance functions on other DNA objects. Again, any of these objects could be conditioned on a requisite level of trust being attained by entity 11.

The third type of objects stored in object store 17 are policy objects 31. DNA server 71 is capable of providing a fully compliant implementation of NIST-RBAC-STD through the incorporation of policy objects 31. This standard, developed by the US National Institute of Standards and Technology, specifies a Role Based Authorization Control (RBAC) methodology in which an entity 11 is assigned to a group having a corresponding group object 77, with the group object 77 having at least one specified permission object 75 associated with it. In addition, constraints such as exclusionary roles and minimum sufficiency can be specified. For instance, if an exclusionary policy is included in policy object 31, which is associated with entity 11, and policy object 31 limits the amount of permission objects 75 to three concurrent permission objects, DNA server 71 will not allow entity 11 to access more than three of these permission objects 75. Additionally, a complimentary policy to (although not directly associated with) RBAC methodology would be a collaborative policy contained within policy object 31, in which case DNA server 71 would require a quorum of entities 11 to be authenticated within DNA server 71 before a permission object 75 would be granted to any of them. Another kind of policy object 31 would be to provide a global one-user-at-a-time policy over a set of services.

All DNA objects, whether local or remote, contain two data elements understood and managed by the DNA server 71. First, each object within object store 17 contains an expiration date. This provides a self-cleaning mechanism that helps prevent objects from persisting beyond their useful life. Second, each object within object store 17 contains a reference to the identity object 19 of the administrator of that object. A notification to an object's administrator is sent when that object expires. Expiration events also provide the prompting to re-evaluate security decisions made previously, possibly by another person who is no longer involved. Expirations can be defined as hard, in which case the object becomes invalid and an immediate candidate for removal from object store 17. They can also be defined as soft, in which case they persist and are valid during a grace period that is established by a configurable policy object 31.

The second data element contained in each object located in object store 17 is the trust level. As discussed above with reference to the description of permission objects 75, each time entity 11 authenticates to DNA server 71, it is assigned a trust level based on the authentication method used and the credentials provided as proof of identity 13. This trust level is securely forwarded to target 41, and target 41 communicates this level of trust back to DNA server 71 when requesting the DNA objects associated with entity 11. DNA server will then only return those objects for which the requisite trust level has been attained by entity 11. Since the trust level assigned by the authentication service 15 is a reflection of its confidence that entity 11 is in fact entity 11, it is very appropriate to base authorization and other decisions on the sense of risk associated with allowing access to information resources and systems. For example, a simple username/password authentication might be sufficient to gain access to non-critical data and service functions. The trust level associated with this authentication would not be very high but, for low-risk functions, would be considered sufficient. If entity 11 authenticates using two or three factor security such as an encrypting token device augmented by a PIN or password and possibly a biometric element such as a fingerprint, a significantly higher level of trust would likely be assigned by DNA server 71. This higher level of trust could be used to grant access to sensitive system administration functions such as granting access permissions to other entities. Because this level of trust is generated upon the initial communication between entity 11 and DNA server 71 and not only accompanies any attempt by entity 11 to access a target 41, but also any communication between a target 41 and DNA server 71, an entity 11 can never modify or create objects such that they would specify trust levels higher or lower than the level currently assigned to entity 11. This ensures that an administrator cannot enhance their own access or that of others beyond their own authority. Furthermore, it is quite reasonable for administrators to employ multiple methods of authentication depending on the targets they wish to access.

The process described above and shown in FIGS. 1-3 culminates in a single sign-on system. The permissible actions allowed to be taken by entity 11 are pre-determined and programmed into DNA server 71. Thus, with a single sign-on, entity 11 will essentially allow DNA server 71 to analyze whether or not entity 11 should be allowed access to a target 41, conditioned by the level of trust placed in the type of authentication engaged in by entity 11. Furthermore, because the identity and level of trust associated with entity 11 is propagated to every target 41 accessed by entity 11, every target 41 can continue to propagate the identity and level of trust associated with entity 11 whenever the need arises without further prompting from entity 11.

Figure 4:
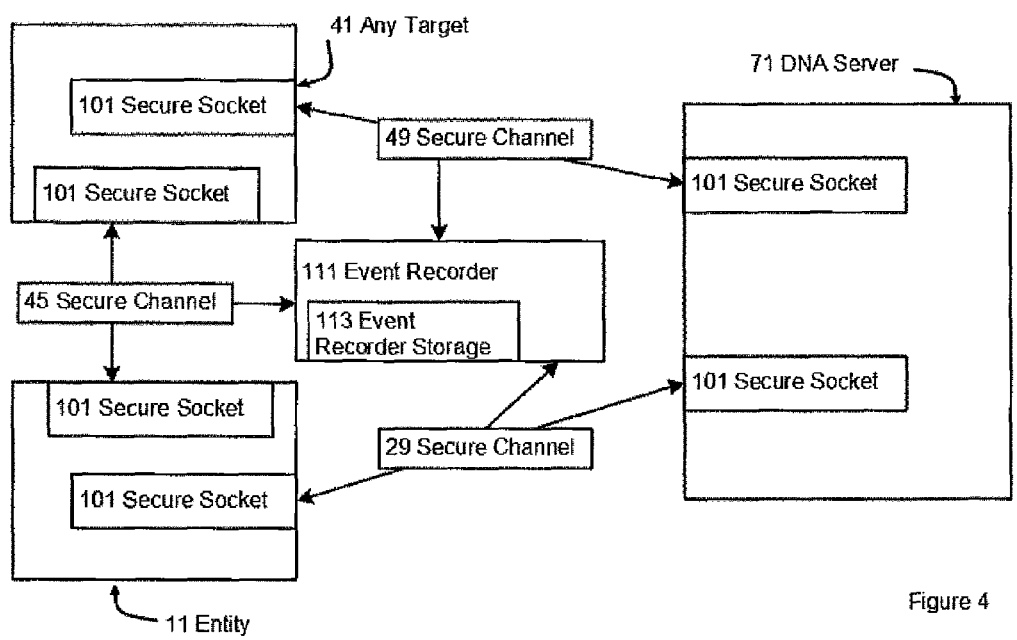
FIG. 4 is a block diagram depicting various protection and security mechanisms for a distributed computer system.

FIG. 4 illustrates the use of secure socket 101. Such a socket provides a superset of the functionality of a conventional communications socket layered on top of the secure channels of the enterprise, such as secure channels 29, 45 and 49. This makes it very simple for a software application writer to employ the system of the present invention when developing applications which communicate with other applications within the enterprise. The programming semantics of sending and receiving data are identical to conventional, non-secure sockets with the exception of initial connection setup. Additional functionality optionally available to the developer if they wish to take advantage of it when using a secure socket 101 is in the area of access to the proof of identity 15 (as shown in FIG. 1) of the entity 11 at the other end of the secure socket connection and access to DNA objects associated with entity 11 and target 41. Another important aspect of the present invention is the event recorder 111 which consolidates messages coming from all secure channels (e.g. secure channels 29, 45 and 49), as well as routine operations events and anomalies detected by DNA server 71 and writes them to the event recording store 113. In addition, the event recorder 111 provides a subscription capability to other authorized services so that the event messages can be analyzed, for instance by a health monitor, for security attack patterns, and can generate system performance characteristics. Conditions of concern detected by such a health monitor include:

Repeated authentication failure attempts from the same source indicating a possible attempt to guess authentication credentials.

Repeated message corruption indicating a possible attack against a secure channel or a network pathway damaging packets during transmission.

Attempts to use expired or revoked credentials that might indicate an attempt to gain unauthorized access to secured entities.

Messages containing expired timestamps and/or duplicate nonce values that might indicate a message replay attack.

Taken together the features and functions of the DNA service provide a powerful, generalized, secure, and extensible platform for sophisticated authorization and customization capabilities.

For the purposes of illustration only, without intending to limit any of the possible embodiments of the present invention, a practical application of the present invention is described below in connection with a hypothetical corporation. Within this corporation are three departments, Accounting, Operations, and Sales and Marketing. Within these three departments are various systems. Within Accounting, there is an accounts payable system, an accounts receivable system, a general ledger, and a payroll system. Within Operations there is a plant systems system, an inventory control system, and a maintenance management system. Finally, within Sales and Marketing, there is a contact management system, a sales history system, and a presentation tools system. It is foreseeable that an employee, such as an accounts payable clerk, would need full access to some of these systems, limited access to others, and may not need to access some systems at all. Within this criteria, the system of the present invention would perform as follows.

The clerk would normally sign in at his computer terminal. By this action, the DNA server would authenticate the user name and password and establish a binding between the clerk and DNA server if the clerk's identity is properly authenticated. The clerk would then open a web browser which would automatically initiate a request for the corporate facilities menu, The clerk sees the corporate facilities main menu presented. The menu system employed at this company chooses to only present the systems that the user has some access to. This user does not have access to the Sales and Marketing systems, so that option does not appear on the user's menu. Although the user has access to some, but not all of the functions within Operations, the Operations menu is none the less displayed. The mechanics of this is accomplished within the system by a request being sent to the DNA server asking for a binding to the corporate facilities menu server. With this binding, the user's session can build a secure socket to the corporate facilities menu server and request the main menu. Because a secure socket is used, the corporate facilities menu server has the authenticated identity of the clerk. Using it's binding to DNA server, the server requests the DNA associated with our AP clerk.

Next the clerk would select the accounts payable system within the menu displayed. By virtue of this user being an accounts payable clerk and for the purposes of this illustration, the clerk is capable of entering or viewing any vendor information, but not able to prepare or print checks. The authorization needed is granted and the Accounts Payable menu is displayed. The mechanics within the system for accomplishing this are that, because the accounts payable system is separate from the corporate menu system, the user's session uses its Binding to DNA server to request a binding to the accounts payable system. The user's session then uses this binding to build a secure socket to the AP system and request the name menu. The accounts payable system, using its secure socket to DNA server requests the DNA associated with the user.

Within the accounts payable system, the clerk wishes to enter bills and thus selects "Enter Bills" within the system. The authorization needed is granted and the accounts payable bill entry form is displayed by the DNA Server, using its secure socket to the accounts payable system. Within this system, the clerk could select options such as "Print Cash Requirements," "Inventory Control," or "On Hand Report" and because the user's DNA is already known by the system, the system has determined that the clerk has permission to access these files and allows the clerk to do so. However, if the clerk desired to access the payroll system, he would not be able to due to the fact that because access to this system was not given with his DNA. The DNA server did not find a permission object to access this system, thus no permission object pertaining this system was copied to the accounts payable system, and the accounts payable system would not display this option of the clerk's screen. All of these instances of authentication and access would be recorded to the event recorder. A health monitor would then receive this data from the event recorder and analyze this data. Abnormal conditions detected by the health monitor can be automatically reported to enterprise operations personnel for additional analysis and possible corrective response.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method of providing one time authentication to a distributed computing environment using any known authentication mechanism and assigning a level of trust to the authentication mechanism used, wherein-authentication is separated from authorization, allowing authorization to be based on said level of trust to secure communications within said environment, and wherein said environment includes at least one originating entity and at least one target entity and one or more trusted third party servers, said one or more third party servers evaluating said authentication mechanism used by said originating entity and assigning a level of trust calculated by the confidence it has in the authentication mechanism used, wherein said level of trust can be used to dynamically change access within said environment, said method including the steps of:
   a. authenticating the identity of said originating entity using one of a predetermined plurality of known authentication mechanisms, said mechanism being separately evaluated and assigned a level of trust by said server, said authentication of identity being limited in use to authentication only, and wherein not all of the predetermined plurality of authentication mechanisms are trusted at a same level of trust other than untrusted;
   a1. evaluating via said server how secure is said authentication mechanism used by said now authenticated originating entity;
   a2. calculating the confidence said server has in the instance of the authentication mechanism used;
   a3. assigning a level of trust that will be associated with said confidence;
   a4. dynamically calculating using said level of trust what authorization, access and information can be granted to said originating entity regarding said target entity;
   b. transmitting a response, from said server to said originating entity regardless of the authentication mechanism used, containing a first binding element encrypted using a key derived from a secret stored by said server about the originating entity and its request to access said target entity, and a trust level indicating the level of confidence said server has associated with said originating entity's authentication mechanism instance;
   c. transmitting a second request that changes and transforms said response containing a first binding element by using knowledge of the same secret of itself, from said originating entity regardless of the authentication mechanism it has used, to said server, thereby requesting a second binding element from said server;
   d. transmitting a second response containing said second binding element including a unique signature regarding said originating entity and its request to access said target entity to be used by said target entity, from said server to said originating entity;
   e. transmitting said second response containing said second binding element, from said originating entity to said target entity;
   f. transmitting a response from said target entity to said originating entity indicating access acceptance of said originating entity by said target entity; and
   g. creating a secure communication link between said target entity and said originating entity based on said evaluations, assignments and calculations.

2. The method as set forth in claim 1, further including the step of creating a secure communication link between said server and said originating entity based on said evaluations, assignments and calculations.

3. The method as set forth in claim 2, further including the step of creating a secure communication link between said target entity and said server based on said evaluations, assignments and calculations.

4. The method set forth in claim 3 further including the steps of:
   a. providing an event recorder, where said event recorder is authenticated and authorized-based on said evaluations, assignments and calculations;
   b. transmitting chosen events from within said secure communication link between said originating entity and said target entity, said entities authenticated and authorized to access said event recorder based on said evaluations, assignments and calculations to said event recorder;
   c. transmitting chosen events from said originating entity to said event recorder; and
   d. transmitting chosen events from said target entity to said event recorder.

5. The method as set forth in claim 4, further including at least one step of:
   e. transmitting chosen events from within said secure communication link between said originating entity, authenticated and authorized based on said evaluations, assignments and calculations, and said server to said event recorder; and
   f. transmitting chosen events from within said secure communication link between said target entity, authenticated and authorized based on said evaluations, assignments and calculations and said server to said event recorder.

6. The method as set forth in claim 5, further including the steps of:
   g. monitoring said chosen events for pre-selected types of activities; and
   h. reporting said events to any said entity authenticated and authorized to receive said events, based on said evaluations, assignments and calculations.

7. The method set forth in claim 1, further including objects wished to be held in secure storage associated with said originating entity, said objects selected from the group consisting of authentication, authorization, permission, name/value, credential, client specific, group, group information, group membership, personalization, legacy system access, role based authorization control, and other objects wished to be private, and including the steps of:
   a. storing in said server one or more objects associated with said originating entity, each requiring a sufficient level of trust for assignment;
   b. sending a request from said target entity to said server for one or more objects regarding said originating entity, which has been authenticated and whose authentication mechanism instance has been assigned a level of trust, from said server;
   c. selecting from said secure storage, utilizing said level of trust that said server has established for said originating entity's authentication mechanism instance, one or more of said objects associated with said originating entity and only retrieving said objects that do not exceed said level of trust;
   d. transmitting said selected objects from server to said target entity; and
   e. utilizing said selected objects to establish the level of authorization granted to said originating entity regarding said target entity.

8. The method set forth in claim 5, further including the steps of:
   a. providing a method to monitor the operational characteristics of all links said server has participated in establishing;
   b. monitoring all communications between said server, said originating entity and said target entity;
   c. recognizing abnormal characteristics and communications within said communications; and
   d. reporting of said abnormal characteristics and communications to the event recorder, using said established secure communication link to said event recorder without participating entities being aware that reporting is taking place.

9. The method set forth in claim 1, further including the step of assigning a time stamp and a nonce value to all communications between said server, said originating entity and said target entity.

10. In a distributed computing environment, an apparatus for providing one time authentication using any known authentication means and assigning a level of trust to the authentication means used, wherein authentication is separated from authorization, allowing authorization to be based on said level of trust to secure communications within said environment, and wherein said environment includes at least one originating entity and at least one target entity and one or more trusted third party servers, said one or more third party servers evaluating said authentication means used by an said originating entity and assigning a level of trust calculated by the confidence it has in the authentication means used, wherein said level of trust can be used to dynamically change access within said environment, said apparatus including:
   a. a server, where said server is a trusted third party that evaluates said authentication means used by an originating entity and assigns a level of trust calculated by the confidence it has in the authentication means used by said originating entity, wherein said level of trust is used to dynamically change access within said environment, and wherein not all authentication means are trusted at a same level of trust other than untrusted;
   b. an authentication device verifying the identity of said originating entity using any known authentication means, said means to be separately evaluated and assigned a level of trust by said server, said authentication of identity to be limited in use to authentication only;
      b1. a device evaluating how secure is the authentication means used by said now authenticated originating entity;
      b2. a device calculating the confidence said server has in the authentication means used by said originating entity;
      b3. a device assigning a level of trust that will be associated with said confidence;
      b4. a device dynamically calculating using said level of trust, what authorization, access and information can be granted to said originating entity regarding a target enity;
   c. a device generating a first binding element, said first binding element including a unique signature encrypted using a key derived from a secret stored by said server about the originating entity and its request to access said target entity, and a trust level indicating the level of confidence said server has associated with said originating entity's authentication means instance regardless of the authentication means it has used;
   d. a device transferring said response containing said first binding element from said server to said originating entity upon proper verification of said identity of said originating entity regardless of the authentication means it has used;
   e. a device generating a second binding element including information regarding access of said target entity by said originating entity, originating in said server and used to establish communication between said originating entity and said target entity, said response containing said second binding element including a unique signature regarding said originating entity and its request to access said target entity to be used by said target entity, and proof of said originating entity's authentication means instance regardless of the authentication means it has used;
   f. a device transferring said second response containing second binding element to said originating entity; and
   g. a device transmitting said second response containing second binding element from said originating entity to said target entity.

11. The apparatus of claim 10, further including objects wished to be held in secure storage related to one or more of said originating entity and said target entity, said objects requiring a sufficient level of trust for assignment, said objects selected from the group consisting of authentication, authorization, permission, name/value, credential, client specific, group, group information, group membership, personalization, policy related to at least one portion of said environment, legacy system access, remote, role based authorization control, and other objects wished to be private, and said objects to be stored securely where said objects are not accessible except using the apparatus, said objects stored in said server.

12. The apparatus of claim 11, further including a device allowing said target entity to request at least some of said objects from said server where said target entity is utilizing said server acting as a trusted third party to determine information about said originating entity, said server utilizing level of trust assigned to said originating entity requesting access to said target entity.

13. The apparatus of claim 10, wherein said authentication device verifying the identity of said originating entity comprises an encryption device using a secret key encryption algorithm.

14. The apparatus of claim 10, wherein said authentication device verifying the identity of said originating entity comprises a device using a password.

15. The apparatus of claim 10, wherein said authentication device verifying the identity of said originating entity comprises a device using a private key/public key combination associated with a public key certificate.

16. The apparatus of claim 10, further including an encryption device encrypting all communications between said originating entity, said server acting as a trusted third party, and said target entity, regardless of the authentication means said entities have used.

17. The apparatus of claim 11, wherein said first binding element includes personalization information for said originating entity, whether level of trust assigned to said originating entity is sufficient for accessing the services of said target entity, and to what class or groups said originating entity belongs, wherein said personalization information is stored in one of said objects.

18. The apparatus of claim 10, further including a channel listener attached to said target entity, to detect the presence of said request containing first binding element from an originating entity.

19. The apparatus of claim 10, further including an event recorder where access to the event recorder is authenticated and authorized using said trust level to record all communications between said originating entity, said server, and said target entity, where all sources of information to said recorder are also authenticated and authorized using said apparatus, and said event recorder also records any instances of eavesdropping or security breaches without participating entities being aware reporting is taking place.

20. The apparatus of claim 19, further including a device monitoring operational characteristics of all links said server has participated in establishing from within the link itself, and reporting abnormal activity within said environment to said event recorder without participating entities being aware reporting is taking place.

* * * * *